United States Patent
Derrick et al.

(12) 
(10) Patent No.: US 6,442,675 B1
(45) Date of Patent: Aug. 27, 2002

(54) COMPRESSED STRING AND MULTIPLE GENERATION ENGINE

(75) Inventors: John Edward Derrick, Round Rock; Lee Evan Eisen; Hung Qui Le, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/363,464

(22) Filed: Jul. 29, 1999

(51) Int. Cl.$^7$ ................................................ G06F 9/38
(52) U.S. Cl. ........................ 712/209; 712/211; 712/225; 712/241
(58) Field of Search ................................ 712/209, 211, 712/225, 241

(56) References Cited

U.S. PATENT DOCUMENTS

| | | |
|---|---|---|
| 4,875,160 A | 10/1989 | Brown, III |
| 5,341,482 A | 8/1994 | Cutler et al. |
| 5,440,703 A | 8/1995 | Ray et al. |
| 5,481,693 A | 1/1996 | Blomgren et al. |
| 5,606,696 A | 2/1997 | Ackerman et al. |
| 5,717,946 A * | 2/1998 | Satou et al. ............ 712/225 |
| 5,721,867 A | 2/1998 | Kuttanna et al. |
| 5,794,063 A * | 8/1998 | Favor ..................... 712/23 |
| 6,055,625 A | 4/2000 | Nakada et al. |
| 6,070,238 A | 5/2000 | Feiste et al. |
| 6,128,722 A | 10/2000 | Fry et al. |

OTHER PUBLICATIONS

U.S. patent application Ser. No. 09/345,161, Derrick et al., filed Jun. 29, 1999.
U.S. patent application Ser. No. 09/354,498, Derrick et al., filed Jul. 16, 1999.
U.S. patent application Ser. No. 09/363,463, Kahle et al., filed Jul. 29, 1999.
IBM Technical Disclosure Bulletin, Jun. 1992, IBM, NN9206345, vol. 35, Issue No. 1B, pp. 345–347.
IBM Technical Disclosure Bulletin, Jan. 1993, IBM, NN9301395, vol. 36, Issue No. 1, pp. 395–396.

* cited by examiner

Primary Examiner—William M. Treat
(74) Attorney, Agent, or Firm—Anthony V. S. England; Bracewell & Patterson, L.L.P.

(57) ABSTRACT

A generalized, programmable dataflow state-machine is provided to receive information about a particular string instruction. The string instruction is parsed into all the operations contained in the string instruction. The operations that make up the string instruction are routed to parallel functional units and executed. The state-machine manipulates the size of the operations in the string instruction and whether or not the instructions need to be generated.

10 Claims, 4 Drawing Sheets

COMPRESSED STRING AND MULTIPLE GENERATION ENGINE

RELATED APPLICATIONS

The present application is related to the subject matter of the following applications: Ser. No. 09/345,161 entitled "Method and Apparatus for Modifying Instructions in a Superscalar Processor" and filed Jun. 29, 1999, now U.S. Pat. No. 6,321,380; Ser. No. 09/263,667 entitled "An Instruction Buffer Arrangement for a Superscalar Processor" and filed Mar. 5, 1999; Ser. No. 09/354,498 entitled "Method and Apparatus for Software Based Dispatch Stall Mechanism for Scoreboarded IOPs" and filed Jul. 16, 1999, now U.S. Pat. No. 6,345,356; and Ser. No. 09/363,463 entitled "XER Scoreboard Mechanism" and filed Jul. 29, 1999. The content of the above-referenced applications is incorporated herein by reference.

BACKGROUND OF THE INVENTION

1. Technical Field

The present invention relates in general to data processing systems and in particular to a processor in a data processing system. More particularly, the present invention relates to processing string and multiple load/store instructions.

2. Description of the Related Art

String instructions are data structures that consist of "multiples," which are instructions that are subsets of string instructions. The multiples' size is measured in half word, word or word lengths and typically, the multiples within the string require sequencing for appropriate processing. String instructions, as a whole, present a problem for Reduced instruction set computer ("RISC") processors. Because of the architecture, RISC processors utilize a relatively small set of fundamental instructions and repeat that set of instructions at a high clock frequency. Though RISC processors process only a limited set of fundamental instructions (hereinafter referred to as elements), string instructions, which have varying lengths, are comprised of multiple fundamental instructions and must be broken down to the fundamentals and processed sequentially by the RISC processor.

RISC processors are employed in many data processing systems and are generally characterized by high throughput of instructions. RISC processors usually operate at a high clock frequency and because of the minimal instruction set do so very efficiently. In addition to high clock speed, processor efficiency is improved even more by the inclusion of multiple execution units allowing the execution of two, and sometimes more, instructions per clock cycle. RISC processors are frequently employed as core processing "engines" to larger more complex processors.

Processors with the ability to execute multiple instructions per clock cycle are described as "superscalar." Superscalar processors, such as the PowerPC™ family of processors available from IBM Corporation of Armonk, N.Y., provide simultaneous dispatch of multiple instructions. Included in the processor are an Instruction Cache ("IC"), an Instruction Dispatch Unit ("IDU"), an Execution Unit ("EU") and a Completion Unit ("CU"). Generally, a superscalar, RISC processor is "pipelined," meaning that a second instruction is waiting to enter the execution unit as soon as the previous instruction is finished.

In a superscalar processor, instruction processing is usually accomplished in six stages—fetch, decode, dispatch, execute, writeback and completion. The fetch stage is primarily responsible for fetching instructions from the instruction cache and determining the address of the next instruction to be fetched. The decode stage generally handles all time-critical instruction decoding for instructions in the instruction buffer. The dispatch stage is responsible for non-time-critical decoding of instructions supplied by the decode stage and for determining which of the instructions can be dispatched in the current cycle.

The execute stage executes the instruction selected in the dispatch stage, which may come from the reservation stations or from instructions arriving from dispatch. The completion stage maintains the correct architectural machine state by considering instructions residing in the completion buffer and utilizing information about the status of instructions provided by the execute stage. The write back stage is used to write back-any information from the rename buffers that is not written back by the completion stage.

A processor utilizing a RISC processor core is restricted by the limitations of a RISC processor; i.e. minimal instruction length and limited instruction set. The RISC processor core requires that strings and multiples be broken down into a series of simple load or store operations. The RISC processor handles variable length string and multiple load/store instructions by routing each string instruction to the functional unit that executes it, i.e., a load store unit, and the functional unit has to internally recognize this as a string instruction. A problem with this method is the instruction is sequentially executed through a single functional (i.e., load/store) unit, even though there are multiple functional units in a RISC processor. The functional unit must internally break the instruction into smaller instructions before executing each instruction sequentially.

It would be desirable therefore, to provide a method and apparatus that would increase the speed of handling variable length streams of string instructions.

SUMMARY OF THE INVENTION

It is therefore one object of the present invention to provide a method and system that allows for variable length streams of load or store instructions in a RISC processor.

It is another object of the present invention to provide a method and system for converting variable length instructions-into operations usable by a RISC processor.

The foregoing objects are achieved as is now described. A generalized, programmable dataflow state-machine is provided to receive information about a particular string instruction. The string instruction is parsed into all the functions contained in the string instruction. The functions that make up the string instruction are routed to parallel functional units and executed. The state-machine manipulates the size of the functions in the string instruction and whether or not instructions (internal operations) need to be generated.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
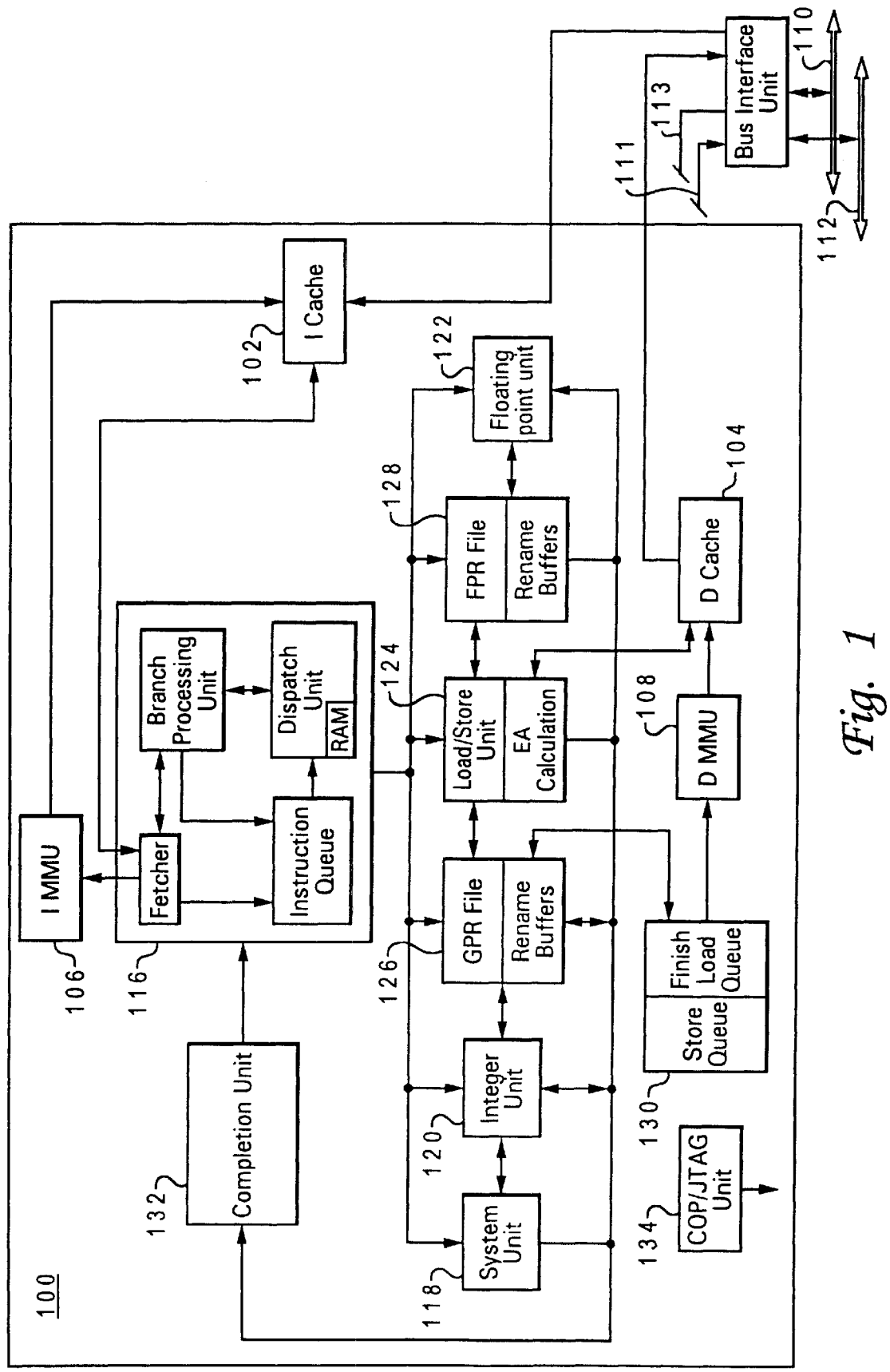
FIG. 1 depicts a block diagram of a processor and related portions of a data processing system in which a preferred embodiment of the present invention may be implemented.

With reference now to the figures, and in particular with reference to FIG. 1, a block diagram of a processor and related portions of a data processing system in which a preferred embodiment of the present invention may be implemented are depicted. Processor 100 is a single integrated circuit superscalar processor, such as the PowerPC™ processor available from IBM Corporation of Armonk, N.Y. Accordingly, processor 100 includes various units, registers, buffers, memories, and other sections, all of which are formed by integrated circuitry. Processor 100 also operates according to reduced instruction set computing ("RISC") techniques.

Processor 100 includes level one (L1) instruction and data caches ("I Cache" and "D Cache") 102 and 104, respectively, each having an associated memory management unit ("I MMU" and "D MMU") 106 and 108. As shown in FIG. 1, processor 100 is connected to system address bus 110 and to system data bus 112 via bus interface unit 114. Bus interface unit 114 is also connected to a parallel and identical RISC processor core (not shown) via Data-cache line 111 and Instruction cache line 113. Bus interface unit 114 shares both processor cores.

Instructions are retrieved from system memory (not shown) to processor 100 through bus interface unit 114 and are stored in instruction cache 102, while data retrieved through bus interface unit 114 is stored in data cache 104. Instructions are fetched as, needed from instruction cache 102 by instruction unit 116, which includes instruction fetch logic, instruction branch prediction logic, an instruction queue and dispatch unit.

The dispatch unit within instruction unit 116 dispatches instructions as appropriate to execution units such as system unit 118, integer unit 120, floating point unit 122, or load/store unit 124. System unit 118 executes condition register logical, special register transfer, and other system instructions. Integer or "fixed-point" unit 120 performs add, subtract, multiply, divide, shift or rotate operations on integers, retrieving operands from and storing results in integer or general purpose registers ("GPR File") 126. Floating point unit 122 performs single precision and/or double precision multiply/add operations, retrieving operands from and storing results in floating point registers ("FPR File") 128.

Load/store unit 124 loads instruction operands from data cache 104 into integer registers 126 or floating point registers 128 as needed, and stores instructions' results when available from integer or floating point registers 126 or 128 into data cache 104. Load and store queues 130 are utilized for these transfers from data cache 104 to and from integer or floating point registers 126 or 128. Completion unit 132, which includes reorder buffers, operates in conjunction with instruction unit 116 to support out-of-order instruction processing, and also operates in connection with rename buffers within integer and floating point registers 126 and 128 to avoid conflict for a specific register for instruction results. Common on-chip processor (COP) and joint test action group (JTAG) unit 134 provides a serial interface to the system for performing boundary scan interconnect tests.

The architecture depicted in FIG. 1 is provided solely for the purpose of illustrating and explaining the present invention, and is not meant to imply any architectural limitations. Those skilled in the art will recognize that many variations are possible. Processor 100 may include, for example, multiple integer and floating point execution units to increase processing throughput. All such variations are within the spirit and scope of the present invention.

Figure 2:
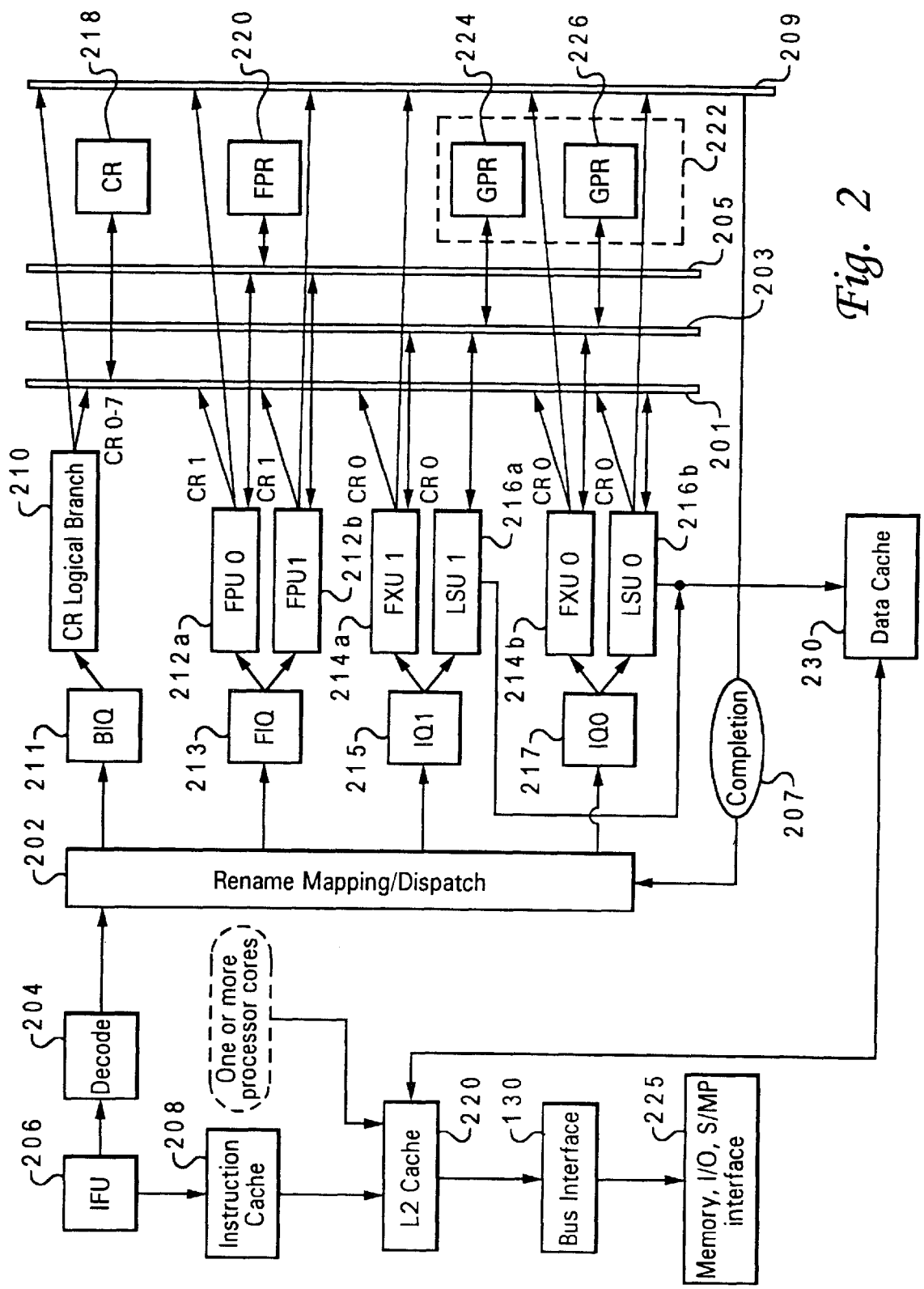
FIG. 2 is a block diagram of a superscalar processor in accordance with a preferred embodiment of the present invention.

Referring to FIG. 2, a block diagram of a superscalar processor in accordance with a preferred embodiment of the present invention, is depicted. To index instructions properly as instructions become wider in complex processors, it is important to optimize the translation from the complex instruction set with a large amount of implicit information to an explicit instruction set that does not require the use of architected registers. It is sometimes important to decompose or translate those instructions into two or more instructions that may not have a direct relationship to the original instruction to allow for faster execution of such instructions.

Processor 200 includes instruction fetch unit (IFU) 206 which provides signals to decode unit 204 which utilizes rename mapping structure 202. Rename mapping structure 202 provides information directly to issue queues 211–217. The issue queues 211, 213, 215 and 217 in turn feed execution units 210, 212a–b, 214a–b, and 216a–b.

Instruction cache 208 stores instructions received from IFU 206. Data cache 230 receives data from execution units 210–216. Level 2 (L2) cache 220 is utilized to store data and instructions from data cache 230 and instruction cache 208. Processor 200 includes bus interface unit (BIU) 230 which passes information between L2 cache 220 and peripheral device interface 225 (i.e., memory, i/o device, mp).

In this embodiment, branch issue queue (BIQ) 211 provides information to condition register (CR) 218 or branch unit 210. The floating point issue queue (FIQ) 213 provides information to floating point units (FPUs) 212a and 212b. Issue queue (IQ) 215 provides information to fixed point unit (FXU) 214a and load/store unit (LSU) 216. IQ 217 provides information to FXU 214b and LSU 216b. Although the issue queues are arranged in the above-identified manner, one of ordinary skill in the art readily recognizes, that the issue queues can be arranged in a different manner and that arrangement would be within the spirit and scope of the present invention.

Conditional register 218 provides and receives information from CR bus 201. Floating point architectural registers (FPR) 220 provide and receive information from FPR bus 205. General purpose registers (GPR) 224 and 226 provide and receive information from GPR bus 203. Completion unit 207 provides information to rename mapping 202 via completion bus 209.

Branch unit 210 provides and receives information via CR bus 201 utilizing, in a preferred embodiment, conditional registers 0–7 (CR 0–7). FPU 212a and FPU 212b provides information to CR 218 via CR bus 201, utilizing in a preferred embodiment conditional register 1 CR1. FPU 212a and 212b also receive and provide information from and to FPR pool 220 via FPR bus 205. FXU 214a, FXU 214b, LSU 216a, LSU 216b output results to CR 218 via CR bus 201, utilizing in a preferred embodiment, conditional register 0 CR0. FXU 214a, FXU 246, LSU 216a and LSU 216b also receive and provide information from and to GPR pool 222 via GPR bus 203. GPR pool 222 in a preferred embodiment is implemented utilizing a shadow GPR arrangement in which there are two GPRs 224 and 226. All of the execution units 210–216 provide results to completion unit 207 via completion bus 209.

Figure 3:
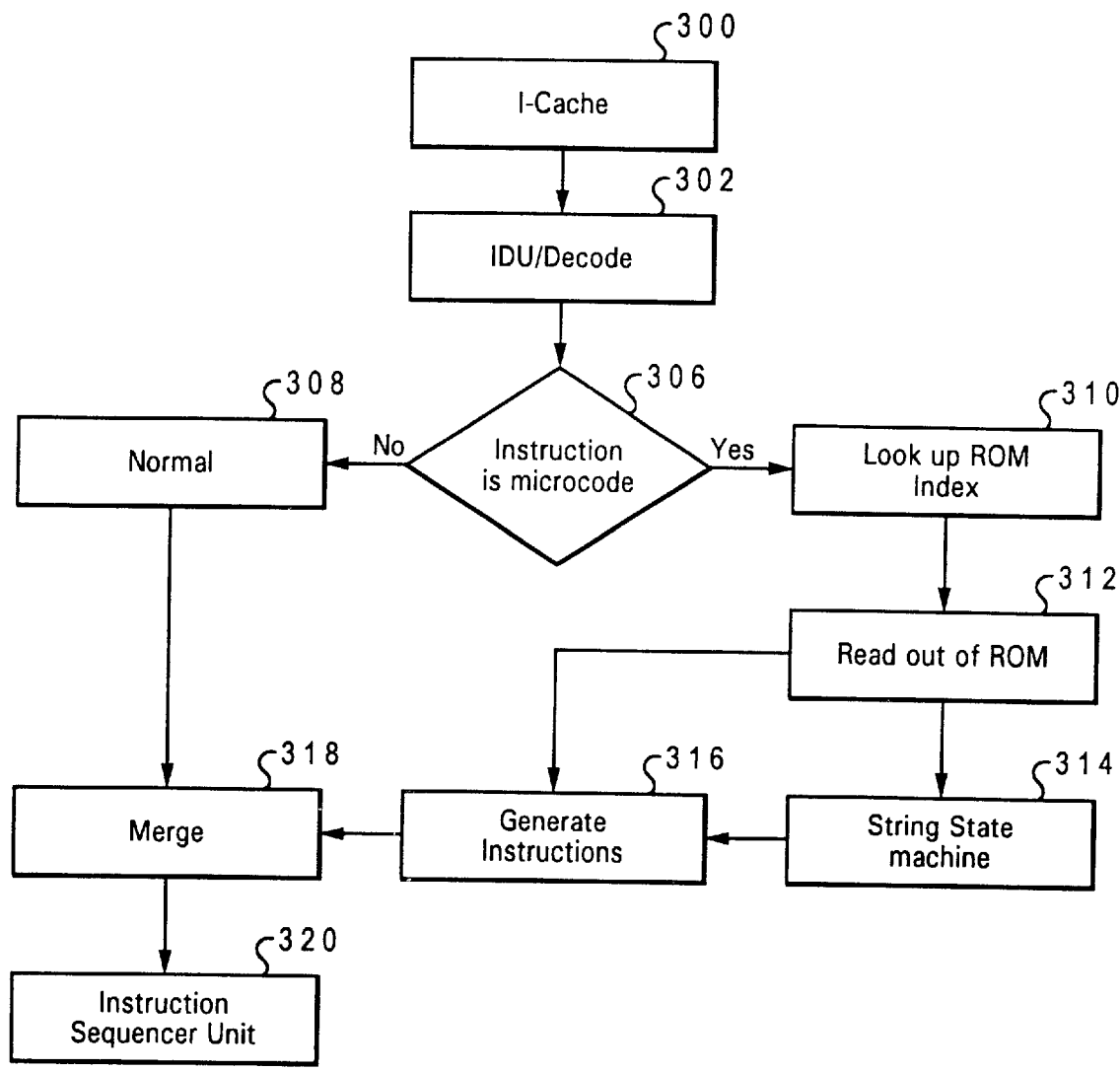
FIG. 3 depicts a high-level flow diagram of a method to generate instructions in accordance with a preferred embodiment of the present invention.

Referring now to FIG. 3, a high-level flow diagram of a method to generate instructions in accordance with a preferred embodiment of the present invention is depicted. The process begins with step 300, which depicts retrieval of an instruction from the Instruction Cache. The process then passes to step 302, which illustrates the instruction being received in the decode pipeline. Next, the process continues to step 306, which depicts a determination of whether the instruction is a microcode instruction. If the instruction is not a microcode instruction, the process proceeds to step 308, which illustrates a non-microcode instruction being routed from the ROM to a multiplexer. The non-microcode instruction passes to step 318, which depicts the instruction being merged, or multiplexed, with other operations.

Returning to step 306, if the instruction is a microcode instruction, the process proceeds instead to step 310, which illustrates the microcode instruction being looked up in a microcode lookup table in a programmed logic array. The ROM recognizes the microcode instruction as a string instruction and the output of the table is then sent to ROM which then activates a string state-machine. Next, the process passes to step 312, which depicts the string instruction being read out of ROM. Concurrently, the ROM's output goes to step 314 and step 316. The instruction is sent to step 316, which illustrates the string instruction being parsed and appropriate operations being generated from the original string instruction. At the same time, a string state-machine (described in FIG. 4) receives the string instruction and the state-machine determines the individual operations within the string instruction. Between the ROM and the state machine, the string is converted into smaller, simpler instructions and it is also determined whether or not the instruction needs to be generated.

The process then proceeds to step 318, which illustrates merging non-microcode and microcode instructions. The process continues to step 320, which illustrates the merged instructions being sent to the Instruction Sequencer Unit.

Figure 4:
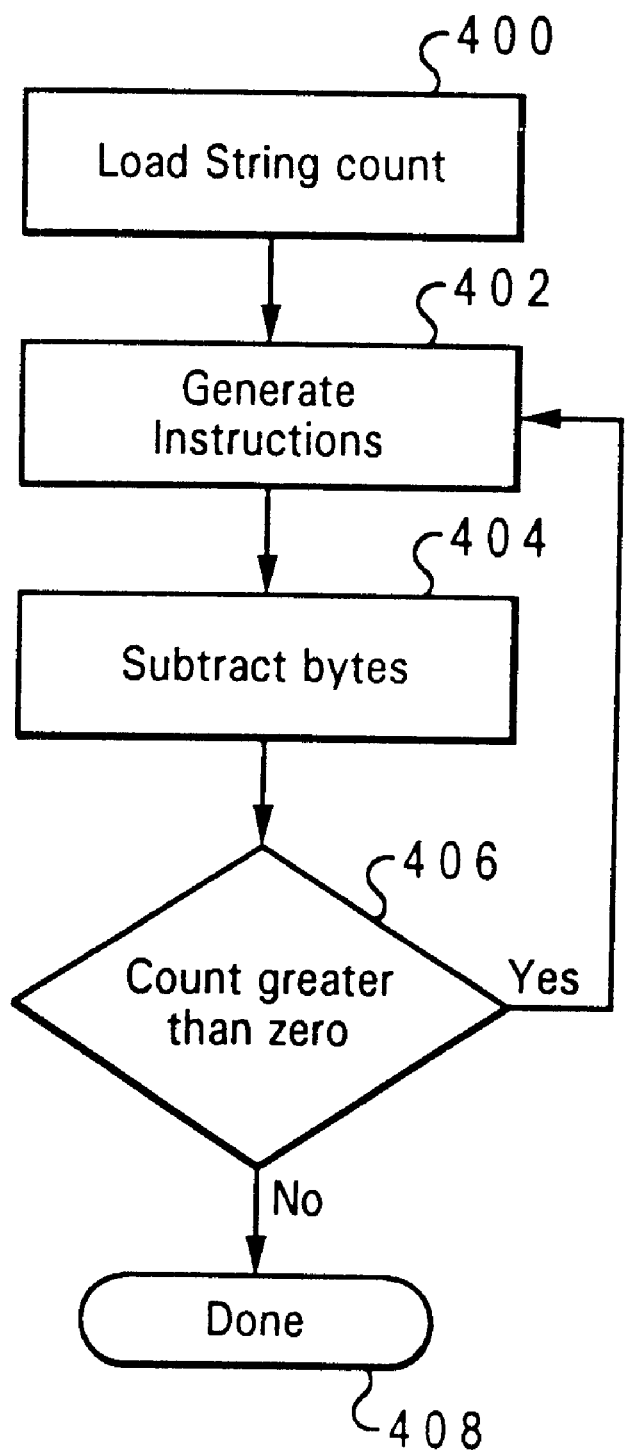
FIG. 4 depicts a high-level flow diagram of the operation of a string state machine in accordance with a preferred embodiment of the present invention.

Referring to FIG. 4, a high-level flow diagram of the operation of a string state-machine in accordance with a preferred embodiment of the present invention is illustrated. The state-machine is a string instruction state-machine that operates exclusively on string instructions. The ROM sends a template to the state-machine which uses the template to modify operations that are generated from the string instruction. In the present invention there are two parallel pipelines: a microcode pipeline and a non-microcode pipeline and the microcode pipeline is controlled by the string state-machine. The state machine determines how many bytes to load or store (in a load/store instruction). If a normal load operation is a word (four bytes) with a four pipeline processor, a conventional method would load sixteen bytes (four in each pipeline) even if the instruction was six bytes. The present invention turns off two of the words and generates a four byte and two byte instruction for the six byte instruction, saving processing time and pipeline space.

The process begins with step 400, which depicts the state-machine loading a string count from Read Only Memory (ROM). The ROM activates the state-machine by instructing the state-machine to read the string count (number of bytes in the string) for the string instruction. This action puts the state-machine on notice that a string instruction is being loaded. The string count is usually determined from the instruction, but may be retrieved from another source. The state-machine does nothing if the instruction is not a string.

The process then proceeds to step 402, which illustrates instructions (actually string operations) being generated for a predetermined value or string count value that is left whichever is less. The process then passes to step 404, which depicts a predetermined number of bytes being subtracted from the string count. The process continues to step 406, which illustrates a determination of whether the string count is greater than zero. If the count is greater than zero, the process returns to step 402 and continues to generate string operations. This process will continue until the string count is no longer greater than zero. If the count is zero or less than zero, the process passes to step 408, which illustrates that the state-machine has generated all the string operations necessary for the string instruction.

By breaking a variable length string instruction into smaller, simpler operations (including manipulating word length) and routing the operations through parallel functional units instead of a single functional unit, the overall speed of the processor is improved.

It is important to note that those skilled in the art will appreciate that the mechanism of the present invention and/or aspects thereof are capable of being distributed in the form of a computer usable medium of instructions in a variety of forms, and that the present invention applies equally regardless of the particular type of signal bearing media used to actually carry out the distribution. Examples of computer usable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for improving instruction processing in a reduced instruction set computer processor, comprising the steps of:

parsing a string instruction into multiple sub-instructions;

generating internal operations from said sub-instructions;

sending a template to a string state-machine for controlling output of said internal operations;

modifying said internal operations based on said template; and sending said modified internal operations to a plurality of parallel functional units.

2. The method of claim 1, wherein parsing a string instruction into multiple sub-instructions, further comprises:

receiving microcode to be processed; and recognizing said microcode as a string instruction.

3. The method of claim 2, further comprising:

locating said string instruction in a look up table, wherein said lookup table is in a programmed logic array.

4. The method of claim 1, wherein sending said template to a string state-machine for controlling output of said internal operations, further comprises:

initiating said string state-machine; and utilizing said template for manipulating the size of said internal operations.

5. The method of claim 4, further comprising:

generating a byte count; and correcting said internal operation sequence.

6. An apparatus for improving instruction processing in a reduced instruction set computer processor, comprising the steps of:

logic means for parsing a string instruction into multiple sub-instructions;

read only memory means for generating internal operations from said sub-instructions;

means for sending a template to a string state-machine for controlling output of said internal operations;

means for modifying said internal operations based on said template; and dispatch means for sending said modified internal operations to a plurality of parallel functional units.

7. The apparatus of claim 6, wherein logic means for parsing a string instruction into multiple sub-instructions, further comprises:

means for receiving microcode to be processed; and identification means for recognizing said microcode as a string instruction.

8. The apparatus of claim 7, further comprising:

means for locating said string instruction in a look up table, wherein said lookup table is in a programmed logic array.

9. The apparatus of claim 6, wherein means for sending said template to a string state-machine for controlling output of said internal operations, further comprises:

means for initiating said string state-machine; and means for utilizing said template for manipulating the size of said internal operations.

10. The apparatus of claim 9, further comprising:

means for generating a byte count; and modifying means for correcting said internal operation sequence.

* * * * *